(12) United States Patent
Du et al.

(10) Patent No.: US 7,447,888 B2
(45) Date of Patent: Nov. 4, 2008

(54) METHOD FOR RESTORING COMPUTER OPERATING SYSTEM

(75) Inventors: Bin Du, Beijing (CN); Wenbing Yang, Beijing (CN); Yuqing Bao, Beijing (CA); Wanding Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 69 days.

(21) Appl. No.: 10/555,431

(22) PCT Filed: Apr. 29, 2004

(86) PCT No.: PCT/CN2004/000423

§ 371 (c)(1),
(2), (4) Date: Nov. 3, 2005

(87) PCT Pub. No.: WO2004/104831

PCT Pub. Date: Dec. 2, 2004

(65) Prior Publication Data

US 2007/0011493 A1      Jan. 11, 2007

(30) Foreign Application Priority Data

May 6, 2003     (CN) ................................ 03 1 30660

(51) Int. Cl.
*G06F 9/00* (2006.01)
(52) U.S. Cl. .................................. 713/1; 713/2; 714/6
(58) Field of Classification Search ........................ None
See application file for complete search history.

(56) References Cited

U.S. PATENT DOCUMENTS 5,732,268 A * 3/1998 Bizzarri .......................... 713/2

(Continued)

FOREIGN PATENT DOCUMENTS

CN     1212062 A     1/1997

(Continued)

OTHER PUBLICATIONS

International Search Report issued by ISA in connection with PCT International Application No. PCT/CN2004/000423.

*Primary Examiner*—Chun Cao
(74) *Attorney, Agent, or Firm*—Dickstein Shapiro LLP

(57) ABSTRACT

The present invention provides a method for restoring a computer operation system comprising at least steps of: a) backing up information related to start up of the computer in an HPA of a hard disk; b) providing a self-checking module in the HPA of the hard disk, and additionally configuring a command for invoking the self-checking module in BIOS of the computer; c) invoking the self-checking module by the BIOS when the computer is booted from the hard disk, and determining by the self-checking module, whether the information related to start up of the computer is destroyed or not, if so, restoring the destroyed parts and then starting up the computer, and if not, directly starting up the computer. With the present invention, each time the computer is booted from the hard disk, the system will automatically check OS boot program files, hard disk boot information, partition table information and data information in a boot sector of a boot partition, and restore those destroyed parts without users' intervention, and thus it facilitates users' utilizations. Meanwhile, the backed up data are stored with the HPA, and the security of the backed up data is ensured.

6 Claims, 4 Drawing Sheets

U.S. PATENT DOCUMENTS

| | | |
|---|---|---|
| 6,161,177 A | 12/2000 | Anderson |
| 6,195,695 B1 * | 2/2001 | Cheston et al. ............. 709/221 |
| 6,374,363 B1 * | 4/2002 | Wu et al. ....................... 714/6 |
| 6,510,512 B1 * | 1/2003 | Alexander ..................... 713/2 |
| 6,898,730 B1 * | 5/2005 | Hanan ........................... 714/7 |
| 7,069,431 B2 * | 6/2006 | Dayan et al. .................. 713/2 |
| 7,111,203 B2 * | 9/2006 | Hu et al. ...................... 714/36 |
| 2003/0037279 A1 * | 2/2003 | Laio .............................. 714/6 |

FOREIGN PATENT DOCUMENTS

| | | | |
|---|---|---|---|
| CN | 1371052 A | | 9/2002 |
| JP | 2003-076614 | * | 3/2003 |
| KR | 1998-068699 | | 12/1998 |
| KR | 2002-0097344 | | 12/2002 |

* cited by examiner

METHOD FOR RESTORING COMPUTER OPERATING SYSTEM

BACKGROUND OF THE INVENTION

1. Field of the Invention

The present invention relates to a field of computer secure technique, and more particularly, to a method for restoring a computer operation system.

2. Description of the Related Arts

Presently, with the spreading of the computers and the perfecting of the Internet, web surfing becomes a necessary part for lives of computer users. However, the amount of computer viruses is becoming larger and larger, and more severe the disaster is. Meanwhile, hackers imperil the security and normal usage of the data for the computer users. How to protect the operation system (OS) has already become a critical problem for the computer users. Generally, besides the operation system is unable to be normally started up due to the destroy of important files of OS caused by users' malfunctions, most cases are in that the operation system can not be normally started up due to the unexpected destroy or missing of the important files of OS or due to the viruses' destroy to the boot records. The solutions thereof are usually as follows:

1) The OS is backed up and restored with backup/restoration techniques. Generally, there are two backup manners, one is to backup with an external storage device such as magnetic disk devices, CDRs, MO, ZIP drivers and floppies, and the other is to backup with a backup hard disk, with this method, in addition to a hard disk for storing the operation system and user data, a backup hard disk for backing up is additionally provided in the computer. When backing up, the computer is booted into a DOS environment to perform backup operation, and when it is finished, the computer is rebooted so as to be switched from the DOS environment to the Windows environment.

The defects of the application of the backing up/restoring techniques lie in that: no matter which manner is used to perform backup operation, user's manual participation is needed and it requires the user having certain abilities for operating computers. If the user does not backup or not backup in time, a lot of data will be lost. And this method requires to backup/restore all the data in the partitions where the operation system is installed, and thus occupies a big space and needs a long backup/restore time period.

2) The OS is backed up and restored with the establishment of different partitions in one and the same hard disk. At present, some hard disk partition software can be used to partition the hard disk, and then save the backed up data in this newly created partition. If the data in other partitions are destroyed, the data in this backup partition can be used to restore those data.

The defect of the establishment of different partitions in one and the same hard disk lies in that this method requires user's manual backup of data. Also, if the user does not backup or not backup in time, a lot of data will be lost. And since the newly created partition is located in one and the same hard disk as other data, it might be also destroyed because the influence of computer viruses or other malfunctions can not be completely avoided. And, these backed up files can be easily accessed or deleted, and therefore this method has a poor security and reliability.

3) The OS is restored with a recovery CD. The computer manufacture directly provides a recovery CD with optical disks or floppies as its carrier while the computer leaves factory, and the recovery CD stores the operation system and application software data when the computer leaves factory. When the user's computer system is broken down, the user can directly use this recovery CD to restore the computer into a state when it leaves factory.

The defect of using a recovery CD lies in that this method is equivalent to manually reinstalling of the OS, and is time-consumed, labor-intense and complex, and nearly all the application programs need to be reinstalled. Additionally, the recovery CD is provided in a form of an attachment, and the user must safely keep it. Once it is lost, the restoration can not be performed any more, and thus it is inconvenience to the user.

4) The OS is restored with the OS self-checking and restoring techniques. The operation system such as Windows has a tool to restore the system into a previous state, and when some failures occurs on the user's computer, the user can reboot the computer, enter the safe mode, and then perform the OS restoration.

The defect of using the OS self-checking and restoring techniques lies in that when the system is destroyed, the user is required to manually reboot the computer, and must enter the safe mode to possibly perform the OS restoration, and otherwise the restoration can not work at all. Moreover, the backed up data are saved in a normal partition and are easily destroyed.

5) The OS is restored with computer security software such as firewall and antivirus software. This method is to manually configure the antivirus software or firewall software into a real-time monitoring state by the user to prevent the intrusions of computer viruses, and to perform virus-killing operations for the OS system with the firewall and antivirus software in order to restore the OS.

The defect of using the firewall and antivirus software lies in that it is not proved heretofore by any theory model that one or several antivirus software can clear all the unknown viruses or hacking programs, and although the antivirus software can clear most viruses, it requires user's manual configurations to perform virus-killing operations, and more, it requires the user to update virus codes on time and thus has some time lags. The execution of the real-time monitoring programs of antivirus and firewall software will occupy some system resources and reduce the performance of the computer. Sometimes, some antivirus and firewall software will conflict with other software and result in the break down of system. And this method can not avoid the loss caused by user's malfunctions or file missing caused by system break down.

In summary, although a number of restoration methods have been proposed heretofore, the common defects thereof lie in that they can only functions with the user's manual operations, and these methods can only protect the security of the OS itself, and when the boot information or partition table of the hard disk is destroyed, the above methods will be ineffective. At the same time, the backed up data is not very secure.

SUMMARY OF THE INVENTION

Therefore, it is an object of the present invention to provide a method for restoring a computer operation system which makes the system, each time booting the computer, automatically check OS boot program files and repair the destroyed parts, and at the same time automatically check hard disk boot information (MBR sector), partition table information, and data information in a boot sector of a boot partition and repair the destroyed parts.

To achieve the above object, the present invention is implemented as follows.

A method for restoring a computer operation system comprising at least steps of:
a) previously backing up all information related to start up of the computer in an HPA (Host Protected Area) of a hard disk;
b) providing a self-checking module in the HPA of the hard disk, and additionally configuring a command for invoking the self-checking module in a Basic Input/Output System (BIOS) of the computer;
c) invoking the self-checking module by the Basic Input/Output System when the computer is booted from the hard disk, and determining by the self-checking module, whether the information related to start up of the computer is destroyed or not, if so, restoring the destroyed parts and then starting up the computer, and if not, directly starting up the computer.

Preferably, all the information related to start of the computer in step a) includes at least files of the operation system, hard disk boot information, partition table information and data information in a boot sector of a boot partition.

Preferably, the step a) further comprises a step of completely backing up the files of the operation system, the hard disk boot information, the partition table information and the data information in the boot sector of the boot partition into the HPA of the hard disk when backing up for the first time.

Preferably, the system performs an incremental backup for the files of the operation system, and a complete backup for the hard disk boot information, the partition table information and the data information in the boot sector of the boot partition in a scheduling or monitoring manner when backing up not for the first time.

Preferably, the backup in a scheduling manner comprises at least steps of:
a1) setting a time point or a time interval for the scheduling backup by the user;
a2) backing up all the information related to start up of the computer when the time point for backup arrives.

Preferably, the backup in a monitoring manner comprises at least steps of:
a1) starting up a monitoring program by the user to monitor all the information related to start up of the computer;
a2) determining whether the data of the monitored files are changed or not, if so, then performing step a3), and otherwise, repeatedly performing step a2);
a3) determining whether the data of the hard disk boot information are changed or not, if so, then performing step a4) after completely backing up the data of the current hard disk boot information, and otherwise directly performing step a4);
a4) determining whether the data of the partition information are changed or not, if so, then performing step a5) after completely backing up the data of the current partition information, and otherwise directly performing step a5);
a5) determining whether the data in the boot sector of the boot partition are changed or not, if so, then performing step a6) after completely backing up the current data in the boot sector of the boot partition, and otherwise directly performing step a6);
a6) determining whether the files of the operation system are changed or not, if so, then ending up the backup operation after incrementally backing up the data of the current operation system, and otherwise directly ending up the backup operation.

Preferably, whether the data of the monitored files are changed or not is determined according to whether sizes, modified time of the monitored files, or a check sum generated from the monitored files is changed or not.

Preferably, checking and restoring all the information related to start up of the computer by the self-checking module in the step c) further comprises steps of:
c1) determining, by the self-checking module, whether the data of the hard disk boot information are destroyed or not, if so, then performing step c2) after restoring the destroyed parts with the hard disk boot information backed up in the HPA, and otherwise directly performing step c2);
c2) determining, by the self-checking module, whether the data of the partition information are destroyed or not, if so, then performing step c3) after restoring the destroyed parts with the partition information backed up in the HPA, and otherwise directly performing step c3);
c3) determining, by the self-checking module, whether the data information in the boot sector of the boot partition is destroyed or not, if so, then performing step c4) after restoring the destroyed parts with the data information in the boot sector of the boot partition backed up in the HPA, and otherwise directly performing step c4);
c4) determining, by the self-checking module, whether data information of a boot program core file of the operation system is destroyed or not, if so, then performing step c5) after restoring the destroyed parts with the data information of a boot program core file of the operation system backed up in the HPA, and otherwise directly performing step c5);
c5) invoking, by a boot program of the operation system, a boot file;
c6) determining whether the currently invoked boot file is normal or not, if so, then directly performing step c7), and otherwise performing step c7) after reading the backed up file in the HPA of the hard disk and replacing the file at question with it;
c7) determining whether it is required to invoke other file or not, if so, then performing step c6) after invoking next boot file, and otherwise normally staring up the computer.

Preferably, the determination of step c1) is made by comparing a full text of the current hard disk boot information on the hard disk with a full text of the hard disk boot information backed up in the HPA, or comparing a check sum generated from the current hard disk boot information on the hard disk with a check sum generated from the hard disk boot information backed up in the HPA;

the determination of step c2) is made by comparing a full text of the current partition information on the hard disk with that of the partition information backed up in the HPA;

the determination of step c3) is made by comparing a full text of the current data in the boot sector of the boot partition on the hard disk with a full text of the data in the boot sector of the boot partition backed up in the HPA, or comparing a check sum generated from the current data in the boot sector of the boot partition on the hard disk with a check sum generated from the data in the boot sector of the boot partition backed up in the HPA;

the determination of step c4) is made by comparing a full text of the current boot program core file of the operation system on the hard disk with a full text of the boot program core file of the operation system backed up in the HPA, or comparing a check sum generated from the current boot program core file of the operation system on the hard disk with a check sum generated from the boot program core file of the operation system backed up in the HPA.

With the present invention, each time the computer is booted from the hard disk, the system will automatically check the OS boot program files, the hard disk boot information, the partition table information and the information in a boot sector of a boot partition, and restore those destroyed parts without users' intervention, and thus it facilitates users' utilizations. Meanwhile, all the information related to start up of the computer is stored with the HPA of the hard disk, and thus the backed up data can not be destroyed by other programs or viruses, and can not be found or modified by various hard disk tools, so that the security of the backed up data is ensured. Since current hard disks for computers generally have a large capacity, the user does not need to purchase other storage device to store the backed up data and the cost is reduced.

DETAILED DESCRIPTION OF THE PREFERRED EMBODIMENTS

Figure 1:
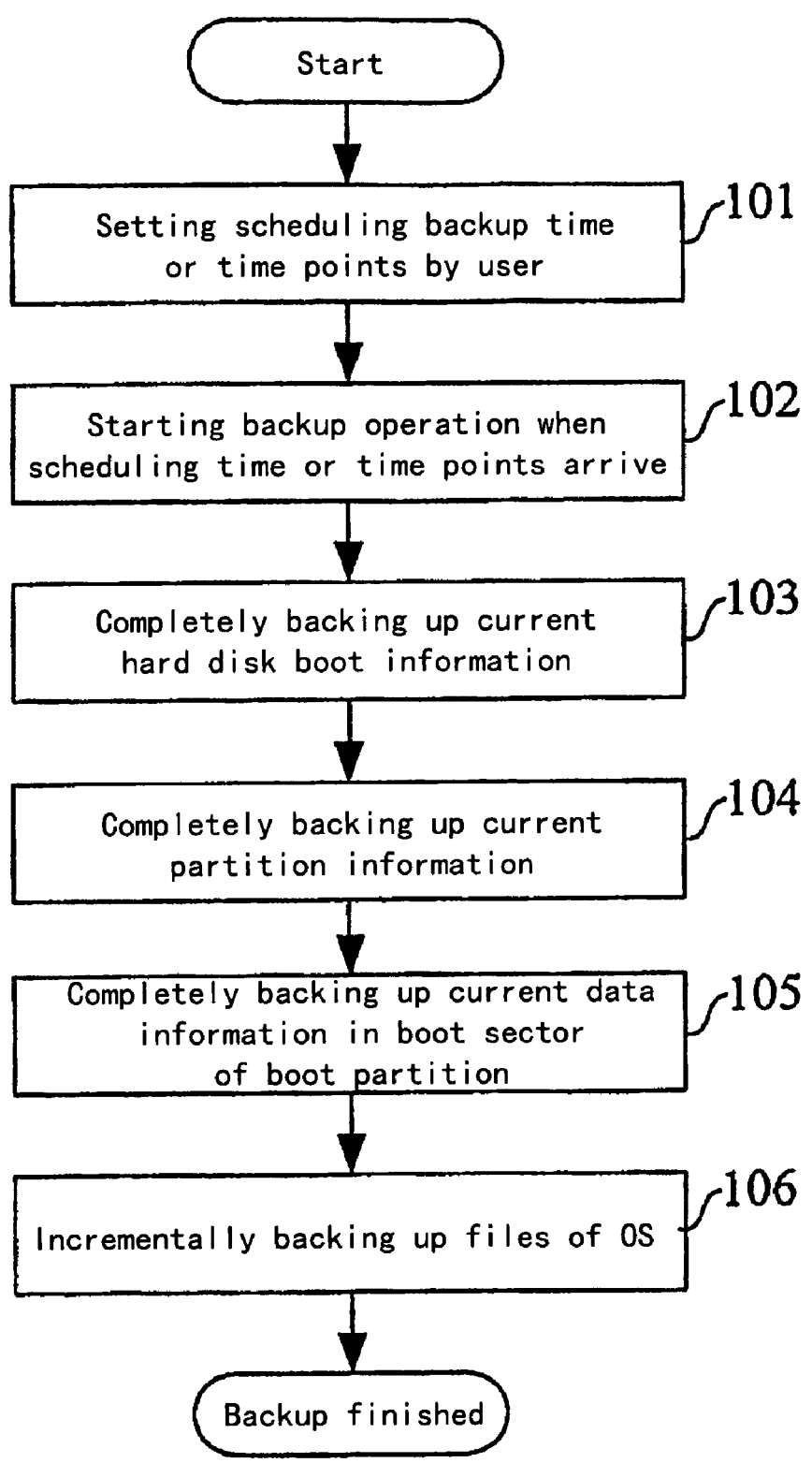
FIG. 1 is a flow chart showing a non-first-time backup performed in a scheduling manner according to the present invention.

The present invention will be further described with reference to the drawings in detailed as below.

The technical idea of the present invention lies in that all boot program files of an OS, hard disk boot information, partition table information and data information in a boot sector of a boot partition are completely backed up into an HPA of a hard disk; a self-checking module is additionally provided in the HPA of the hard disk, and a command for invoking the HPA self-checking module is additionally configured in BIOS; after the BIOS self-checking, if the computer is booted from the hard disk, then the self-checking module in the HPA is firstly invoked to automatically check the boot program files of the OS, the hard disk boot information, the partition table information and the data information in the boot sector of the boot partition, and automatically restore the destroyed parts. Thus, each time the computer is booted from the hard disk, the system will automatically check all information related to start up of the computer and automatically restore the destroyed parts.

A computer hard disk supporting a HPA feature can protect an advanced disk space so that the system or other program can not access this space. The present invention uses this nature of the HPA of the hard disk to ensure the security of the backed up data. In general, the HPA of the hard disk can only be accessed by the system through BIOS or in a DOS environment. But with the invention proposed by the present applicant in. Chinese Patent Application No. 031212969.4 entitled "A Method for Restoring and Backing up the Data in Computer Hard Disk", the HPA of the hard disk can be accessed in a normal operation system environment.

When backing up for the first time, all the boot program files of the OS, the hard disk boot information, the partition table information and the data information in the boot sector of the boot partition are completely backed up into the HPA of the hard disk. When backing up not for the first time, the system performs an incremental backup for all the boot files of the OS, and a complete backup for the hard disk boot information, the partition table information and the data information in the boot sector of the boot partition, such that the system can be selectively restored into various versions of various time points even if these information is destroyed.

The user can configure a strategy for non-first time backups according to specific circumstances. This strategy can be a setting of scheduled time or time points, for example, backing up once every other day or backing up at 12:00 am every Friday. And this strategy can also be in that a monitoring program is configured, for example, files can be monitored with the Windows hook function, or a monitoring program resides in the background of the operation system to check whether sizes, modified time of the monitored files, or a check sum generated from the monitored files is changed in a scheduling manner, and when the monitoring program detects a change of the monitored data, a backup operation is performed.

FIG. 1 is a flow chart showing a non-first-time backup performed in a scheduling manner according to the present invention.

Step 101: the user sets scheduling time or time points;

Step 102: when the scheduling time or time points arrives, the backup operation is started up;

Step 103: the current hard disk boot information is completely backed up;

Step 104: the current partition information is completely backed up;

Step 105: the current data information in the boot sector of the boot partition is completely backed up;

Step 106: the current boot program files of the OS are incrementally backed up and then the backup operation is ended.

Figure 2:
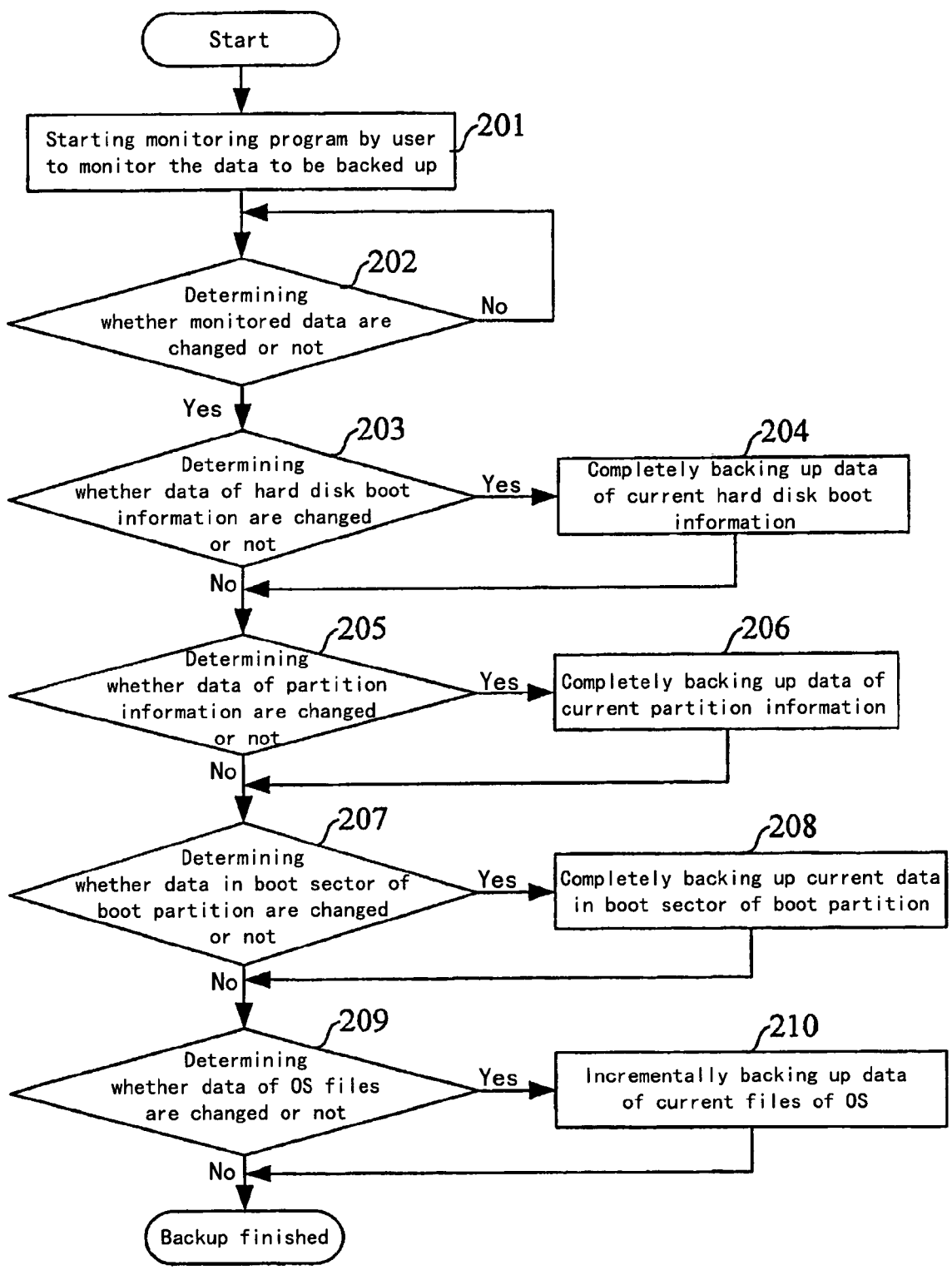
FIG. 2 is a flow chart showing a non-first-time backup performed by using a monitoring program according to the present invention.

FIG. 2 is a flow chart showing a non-first-time backup performed by using a monitoring program according to the present invention.

Step 201: the user runs the monitoring program to monitor all the information related to start up of the computer;

Step 202: whether the data of the monitored files are changed or not is determined according to whether sizes, modified time of the monitored files or a check sum generated from the monitored files is changed or not. If the data of the monitored files are changed, then the process proceeds to step 203, and otherwise step 202 is repeatedly performed;

Step 203: it is determined whether the data of the hard disk boot information are changed or not. If they are changed, then the process proceeds to step 204, and otherwise it goes to step 205;

Step 204: the data of the current hard disk boot information are completely backed up;

Step 205: it is determined whether the data of the partition information are changed or not. If they are changed, then the process proceeds to step 206, and otherwise it goes to step 207;

Step 206: the data of the current partition information are completely backed up;

Step 207: it is determined whether the data of the boot sector in the boot partition are changed or not. If they are changed, then the process proceeds to step 208, and otherwise it goes to step 209;

Step 208: the current data of the boot sector in the boot partition are completely backed up;

Step 209: it is determined whether the files of the OS are changed or not. If they are changed, then the process proceeds to step 210, and otherwise the backup procedure is ended;

Step 210: the data in the current files of the OS are incrementally backed up and then the backup procedure is ended.

Figure 3:
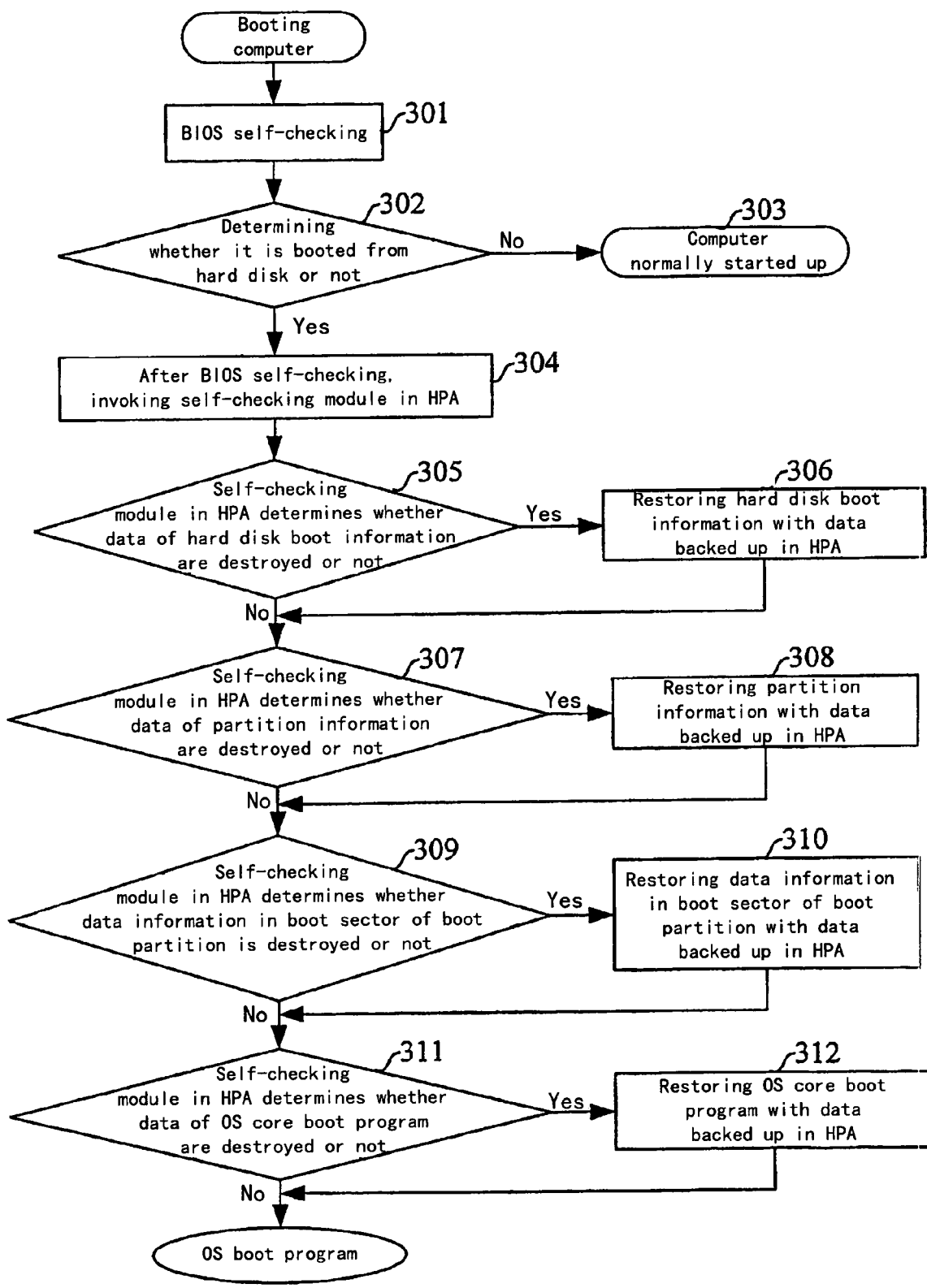
FIG. 3 is a flow chart of automatically checking and restoring OS files, hard disk boot information, partition table information and data information in a boot sector of a boot partition by a system according to the present invention.

FIG. 3 is a flow chart of automatically checking and restoring OS files, hard disk boot information, partition table information and information in a boot sector of a boot partition by a system according to the present invention.

Step 301: BIOS self-checking is performed;

Step 302: the BIOS determines whether the computer is booted from the hard disk or not. If so the process goes to step 304, and otherwise if the computer is booted from floppy or CD-ROM, then it proceeds to step 303;

Step 303: the computer is normally started up, and the process is ended;

Step 304: after the BIOS self-checking, the self-checking module in the HPA is invoked to check all the information related to start up of the computer and restore the destroyed parts;

Step 305: the self-checking module in the HPA determines whether the data of the hard disk boot information are destroyed or not. If so, it proceeds to step 306, and otherwise it goes to step 307. And the determination is made by comparing a full text of the current hard disk boot information on the hard disk with a full text of the hard disk boot information backed up in the HPA, or comparing a check sum generated from the current hard disk boot information on the hard disk with a check sum generated from the hard disk boot information backed up in the HPA;

Step 306: the destroyed parts are restored with the hard disk boot information data backed up in the HPA;

Step 307: the self-checking module in the HPA determines whether the data of the partition information are destroyed or not. If so, it proceeds to step 308, and otherwise it goes to step 309. And the determination is made by comparing a full text of the current partition information on the hard disk with that of the partition information backed up in the HPA;

Step 308: the destroyed parts are restored with the partition information data backed up in the HPA;

Step 309: the self-checking module in the HPA determines whether the data information in the boot sector of the boot partition is destroyed or not. If so, it proceeds to step 310, and otherwise it goes to step 311. And the determination is made by comparing a full text of the current data in the boot sector of the boot partition on the hard disk with a full text of the data in the boot sector of the boot partition backed up in the HPA, or comparing a check sum generated from the current data in the boot sector of the boot partition on the hard disk with a check sum generated from the data in the boot sector of the boot partition backed up in the HPA;

Step 310: the destroyed parts are restored with the data information in the boot sector of the boot partition backed up in the HPA;

Step 311: the self-checking module in the HPA determines whether the data of a boot program core file of the OS are destroyed or not. If so, it proceeds to step 312, and otherwise it goes to a boot program of starting up the OS. And the determination is made by comparing a full text of the current boot program core file of the OS on the hard disk with a full text of the boot program core file of the OS backed up in the HPA, or comparing a check sum generated from the current boot program core file of the OS on the hard disk with a check sum generated from the boot program core file of the OS backed up in the HPA;

Step 312: the destroyed parts are restored with the boot program core file of the OS backed up in the HPA, and then it goes to the boot program for starting up the OS.

Figure 4:
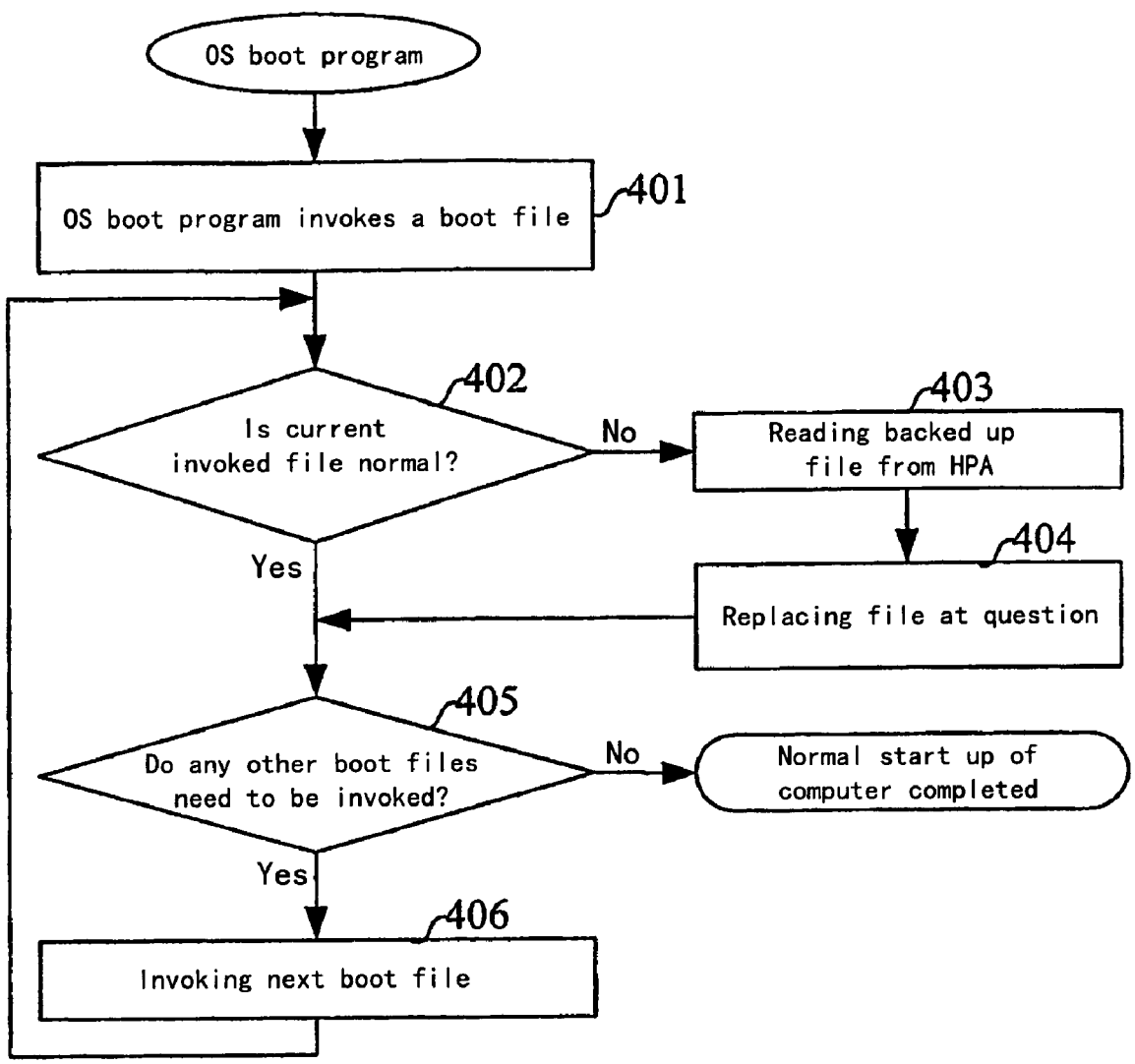
FIG. 4 is a flow chart showing an OS boot program according to the present invention.

FIG. 4 is a flow chart showing an OS boot program according to the present invention.

Step 401: the OS boot program invokes a non-core boot program file;

Step 402: it is determined whether the current invoked file is normal or not. If so, the process goes to step 405, and otherwise it proceeds to step 403;

Step 403: the backed up file is read from the HPA of the hard disk;

Step 404: the file at question is replaced wit the backed up file;

Step 405: it is determined whether other non-core boot program file needs to be invoked. If so, the process proceeds to step 406, and otherwise the computer is normally started up;

Step 406: next non-core boot program file is invoked and then the process returns to step 402.

The preferred embodiments of the present invention only are described in the above and the present invention is not limited thereto. Modifications, equivalent replacements and variations without departing from the spirits and ideas of the present invention are all encompassed in the scope of the present invention.

What is claimed is:

1. A method for restoring a computer operation system, the method comprising at least steps of:

a) previously backing up all information related to start up of a computer in an HPA (Host Protected Area) of a hard disk including at least files of the operation system, hard disk boot information, partition table information and data information in a boot sector of a boot partition;

b) providing a self-checking module in the HPA of the hard disk, and additionally configuring a command for invoking the self-checking module in a Basic Input/Output System (BIOS) of the computer; and c) invoking the self-checking module by the command in the Basic Input/Output System when the computer is booted from the hard disk, and determining by the self-checking module, whether the information related to start up of the computer is destroyed or not, if so, restoring the destroyed parts and then starting up the computer, and if not, directly starting up the computer;

wherein the system performs an incremental backup for the files of the operation system, and a complete backup for the hard disk boot information, the partition table information and the data information in the boot sector of the boot partition in a scheduling or monitoring manner when backing up not for the first time;

the backup in a monitoring manner comprises at least steps of:

a1) starting up a monitoring program by the user to monitor all the information related to start up of the computer;

a2) determining whether the data of the monitored files are changed or not, if so, then performing step a3), and otherwise, repeatedly performing step a2);

a3) determining whether the data of the hard disk boot information are changed or not, if so, then performing step a4) after completely backing up the data of the current hard disk boot information, and otherwise directly performing step a4);

a4) determining whether the data of the partition information are changed or not, if so, then performing step a5) after completely backing up the data of the current partition information, and otherwise directly performing step a5);

a5) determining whether the data in the boot sector of the boot partition are changed or not, if so, then performing step a6) after completely backing up the current data in the boot sector of the boot partition, and otherwise directly performing step a6);

a6) determining whether the files of the operation system are changed or not, if so, then ending up the backup operation after incrementally backing up the data of the current operation system, and otherwise directly ending up the backup operation.

2. The method according to claim 1, wherein the step a) further comprises a step of completely backing up the files of the operation system, the hard disk boot information, the partition table information and the data information in the boot sector of the boot partition into the HPA of the hard disk when backing up for the first time.

3. The method according to claim 1, wherein the backup in a scheduling manner comprises at least steps of:
   a1) setting a time point or a time interval for the scheduling backup by the user;
   a2) backing up all the information related to start up of the computer when the time point for backup arrives.

4. The method according to claim 1, wherein whether the data of the monitored files are changed or not is determined according to whether sizes, modified time of the monitored files, or a check sum generated from the monitored files is changed or not.

5. The method according to claim 1, wherein checking and restoring all the information related to start up of the computer by the self-checking module in the step c) further comprises steps of:
   c1) determining, by the self-checking module, whether the data of the hard disk boot information are destroyed or not, if so, then performing step c2) after restoring the destroyed parts with the hard disk boot information backed up in the HPA, and otherwise directly performing step c2);
   c2) determining, by the self-checking module, whether the data of the partition information are destroyed or not, if so, then performing step c3) after restoring the destroyed parts with the partition information backed up in the HPA, and otherwise directly performing step c3);
   c3) determining, by the self-checking module, whether the data information in the boot sector of the boot partition is destroyed or not, if so, then performing step c4) after restoring the destroyed parts with the data information in the boot sector of the boot partition backed up in the HPA, and otherwise directly performing step c4);
   c4) determining, by the self-checking module, whether data information of a boot program core file of the operation system is destroyed or not, if so, then performing step c5) after restoring the destroyed parts with the data information of a boot program core file of the operation system backed up in the HPA, and otherwise directly performing step c5);
   c5) invoking, by a boot program of the operation system, a boot file;
   c6) determining whether the currently invoked boot file is normal or not, if so, then directly performing step c7), and otherwise performing step c7) after reading the backed up file in the HPA of the hard disk and replacing the file at question with it;
   c7) determining whether it is required to invoke other file or not, if so, then performing step c6) after invoking next boot file, and otherwise normally staring up the computer.

6. The method according to claim 5, wherein
the determination of step c1) is made by comparing a full text of the current hard disk boot information on the hard disk with a full text of the hard disk boot information backed up in the HPA, or comparing a check sum generated from the current hard disk boot information on the hard disk with a check sum generated from the hard disk boot information backed up in the HPA;
the determination of step c2) is made by comparing a full text of the current partition information on the hard disk with that of the partition information backed up in the HPA;
the determination of step c3) is made by comparing a full text of the current data in the boot sector of the boot partition on the hard disk with a full text of the data in the boot sector of the boot partition backed up in the HPA, or comparing a check sum generated from the current data in the boot sector of the boot partition on the hard disk with a check sum generated from the data in the boot sector of the boot partition backed up in the HPA;
the determination of step c4) is made by comparing a full text of the current boot program core file of the operation system on the hard disk with a full text of the boot program core file of the operation system backed up in the HPA, or comparing a check sum generated from the current boot program core file of the operation system on the hard disk with a check sum generated from the boot program core file of the operation system backed up in the HPA.

* * * * *

UNITED STATES PATENT AND TRADEMARK OFFICE
CERTIFICATE OF CORRECTION

PATENT NO. : 7,447,888 B2  Page 1 of 1
APPLICATION NO. : 10/555431
DATED : November 4, 2008
INVENTOR(S) : Bin Du et al.

It is certified that error appears in the above-identified patent and that said Letters Patent is hereby corrected as shown below:

On the Title Page of the Patent:

(30) Foreign Application Priority Data: Please delete "CN 03 1 30660", and insert -- CN 03 1 30660.8 --

Signed and Sealed this

Thirtieth Day of December, 2008

JON W. DUDAS
*Director of the United States Patent and Trademark Office*